United States Patent
Pang et al.

(10) Patent No.: US 9,210,623 B2
(45) Date of Patent: Dec. 8, 2015

(54) WIRELESS CLIENT ASSOCIATION AND TRAFFIC CONTEXT COOKIE

(71) Applicant: Cisco Technology, Inc., San Jose, CA (US)

(72) Inventors: Tak Ming Francis Pang, Fremont, CA (US); Hari Rangarajan, San Jose, CA (US); Seema Nayak, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 13/836,849

(22) Filed: Mar. 15, 2013

(65) Prior Publication Data

US 2014/0269499 A1 Sep. 18, 2014

(51) Int. Cl.
*H04W 4/00* (2009.01)
*H04W 36/00* (2009.01)

(52) U.S. Cl.
CPC .................................. *H04W 36/0033* (2013.01)

(58) Field of Classification Search
CPC . H04L 47/10; H04L 2012/5631; H04L 47/15; H04L 47/2441; H04L 47/70; H04L 12/56; H04L 2012/56; H04W 80/04; H04W 8/26
USPC .......... 370/230, 349, 389, 331, 333; 709/203, 709/227, 231, 237
See application file for complete search history.

(56) References Cited

U.S. PATENT DOCUMENTS

| | | | |
|---|---|---|---|
| 7,275,157 B2 | 9/2007 | Cam Winget | |
| 7,346,772 B2 | 3/2008 | Rebo et al. | |
| 7,350,077 B2 | 3/2008 | Meier et al. | |
| 7,373,508 B1 * | 5/2008 | Meier et al. | 713/168 |
| 7,477,747 B2 | 1/2009 | Stieglitz et al. | |
| 7,761,421 B2 * | 7/2010 | Frolund et al. | 707/637 |
| 8,117,531 B1 * | 2/2012 | Lueck | 715/204 |
| 8,584,207 B2 * | 11/2013 | Dommety et al. | 726/4 |
| 8,676,159 B1 * | 3/2014 | Shu et al. | 455/410 |
| 2006/0047742 A1 * | 3/2006 | O'Neill et al. | 709/203 |
| 2009/0089438 A1 * | 4/2009 | Agarwal et al. | 709/228 |
| 2013/0019000 A1 * | 1/2013 | Markus et al. | 709/223 |

* cited by examiner

*Primary Examiner* — Brenda H Pham
(74) *Attorney, Agent, or Firm* — Patterson & Sheridan, LLP

(57) ABSTRACT

In an example embodiment, an access point or wireless local area network controller programs an opaque cookie into a wireless client. The cookie carries association detail and current traffic information of the client. When the client roams to a new access point, the client presents the cookie to the new access point.

25 Claims, 3 Drawing Sheets

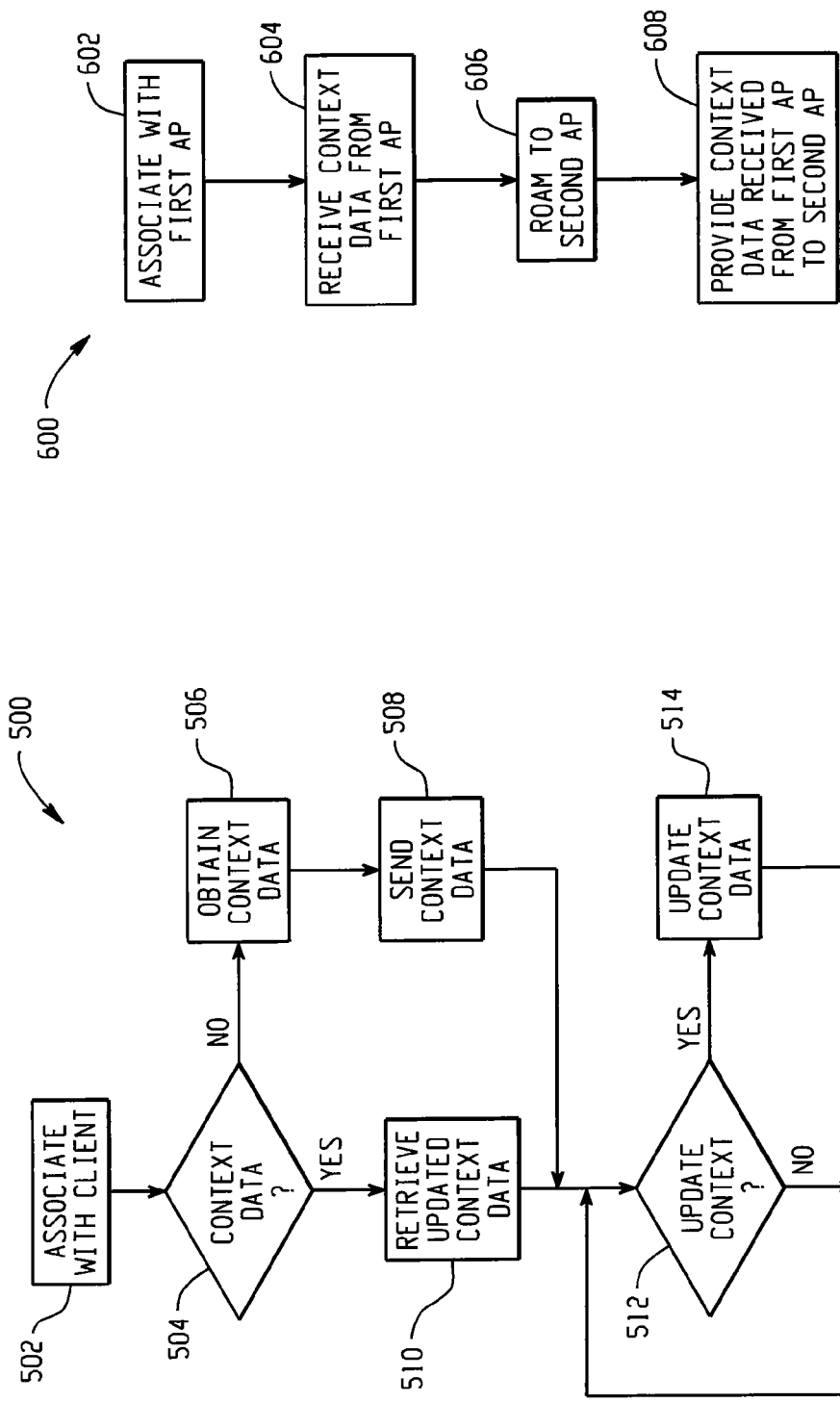

WIRELESS CLIENT ASSOCIATION AND TRAFFIC CONTEXT COOKIE

TECHNICAL FIELD

The present disclosure relates generally to devices that roam in a network, such as wireless devices that roam among access points in a network.

BACKGROUND

In order to support seamless roaming of wireless clients, the wireless infrastructure accesses association and traffic details of the wireless clients. For example, when a client roams to a new access point (AP) and when the new AP processes the association request, the new AP may obtain association and traffic details from the AP that the client is roaming from, and/or the AP looks up the information in a centralized database that may be disposed on a controller or a group leader AP.

BRIEF DESCRIPTION OF THE DRAWINGS

The accompanying drawings incorporated herein and forming a part of the specification illustrate the example embodiments.

FIG. 5 is an example of a methodology performed by an infrastructure node such as an access point or wireless local area network controller.

FIG. 6 is an example of a methodology performed by a mobile device.

OVERVIEW OF EXAMPLE EMBODIMENTS

Figure 1:
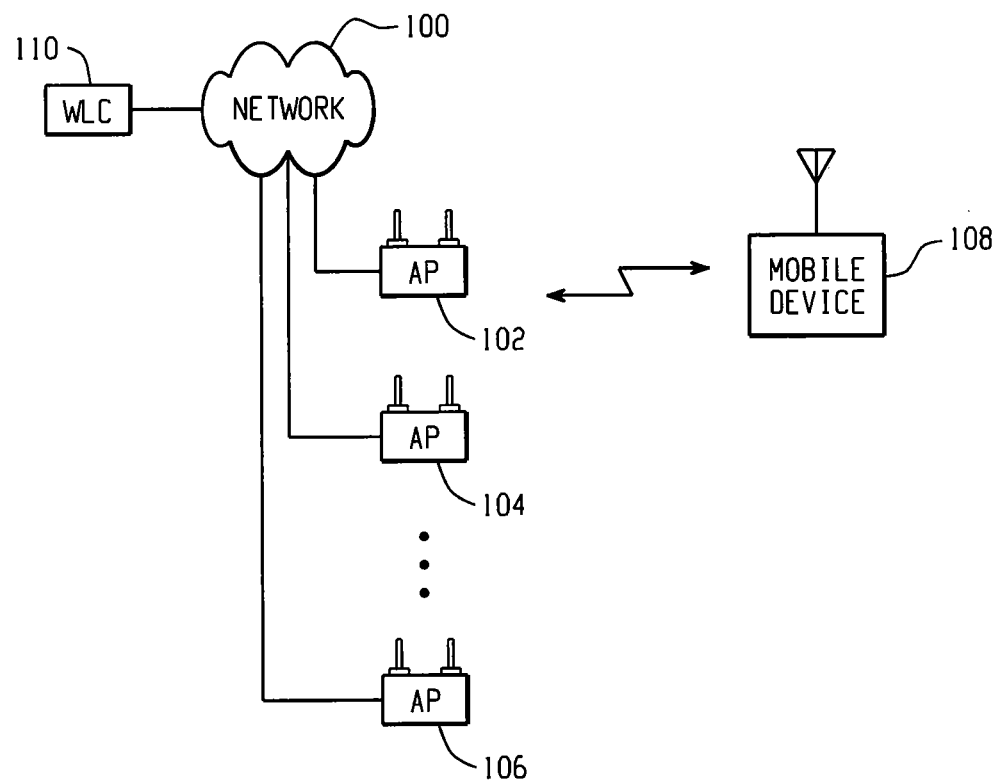
FIG. 1 illustrates an example of a network upon which an example embodiment can be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, an access point programs a cookie, which can be an opaque or a non-opaque cookie, into a wireless client. The cookie carries association detail and current traffic information of the client. When the client roams to a new access point, the client presents the cookie to the new access point.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, an AP/WLC (Wireless LAN Controller) provides an opaque cookie to the wireless client before the wireless client roams. The cookie comprises data representative of the context of the client, such as the WLC, AP, VLAN (Virtual Local Area Network), association details and current traffic information of the client. When the client roams to a new AP, the client hands the cookie to the new AP via the association request.

In an example embodiment, the AP/WLC attaches an opaque cookie with the context of the client as an additional information element (IE) in the association/re-association response. AP/WLC can update this information anytime while the client is associated. In another example embodiment, an AP/WLC can attach an information element to any management frame or action frame sent to the client. For example, a re-authentication frame and/or any 802.11v and/or 802.11k message to the client (as used herein, 802.11 refers to the Institute of Electrical and Electronics Engineers "IEEE" 802.11 standard). The element can also be the sole information element in an action frame.

In particular embodiments, the parent AP/WLC can also update the context data on the client as new context is established. For example, a parent AP can derive NBAR (Network Based Application Recognition) classifiers by snooping client packets and pushes the NBAR classifiers to the client in a signed opaque blob (e.g., a small or incremental amount of data) as they are being derived. The client's NBAR classifiers will later be transferred to the new parent AP when the client roams. The opaque cookie element will be passed by the client to the next AP/WLC in the association request. The client does not need to understand and should not modify the context data. In particular embodiments, the element is protected with encryption and hash key for authentication. A simple shared key can be used between all APs/WLCs.

In an example embodiment, the cookie element can be, for example, a simple TLV (Type Length Value) or a sequence of TLVs and with a checksum at the end. The TLVs can carry, for example, the following information: current WLC IP (Internet Protocol) address or identifier, client mobility group ID, previous admitted services and traffic classifiers, client IP address and VLAN, AP identifiers such as BSSID (Basic Service Set Identifier), Ethernet MAC (Media Access Control) address, IP address, WLANs, channel, location, path metrics and an address of a database device with additional information for the client.

In an example embodiment, the association information can be cascaded. For example, the current AP can preserve the old AP information and add additional new information into the information element. Thus, a detailed client roaming history and specifics can be saved in the cookie. For example, an AP can selectively include details of long-lived flows as well as prioritized voice and video flows which are latency sensitive into the cookie. Residual NBAR/NBAR2 context for less latency sensitive flows that started just before roaming of the client can be retrieved by the new AP from the infrastructure database with the time stamp. To reduce the size of the cookie, context data like NBAR/NBAR2 tuples can be compressed.

FIG. 1 illustrates an example of a network 100 upon which an example embodiment can be implemented. The network 100 suitably comprises access points (APs) 102, 104, 106, and a wireless local area network (also referred to herein as a "wireless LAN controller" or "WLC") 110.

In an example embodiment, a mobile device (also referred to herein as a wireless client) 108 associates with a first access point (AP), which in this example is AP 102. The AP 102 or WLC 110 provisions the mobile device 108 with data representative of context data, such as association context data and/or traffic context data. In particular embodiments, the context data is provided as an opaque cookie to the mobile device 108. The mobile device 108 stores the context data. When the mobile device 108 roams to a new AP, e.g., AP 104 or AP 106, the mobile device 108 provides the context data received from the first AP 102 or WLC 110 to the new AP. The context data may be provided to mobile device 108 in an association and/or re-association response. The AP 102 and/or WLC 110 may update the context information anytime while associated with the mobile device 108.

In an example embodiment, the mobile device 108 receives the context data in a management frame received from AP 102. In another example embodiment, context data is received in an action frame. In yet another example embodiment, context data may be received in management and action frames.

In an example embodiment, the context data is received via an information element (IE) such as a type length value (TLV) field. In particular embodiments, the context data may be received in a sequence of TLV fields. Optionally, a checksum may be employed to validate the context data. The context data may include, but is not limited to, data representative of wireless local area network (WLAN) controller internet protocol (IP) address, a client mobility group identifier, previous admitted services and traffic classifiers, an IP address for the wireless client, virtual local area network (VLAN) for the client, AP basic service set identifier (BSSID), access point Ethernet media access control (MAC) address, AP IP address, channel, location, path metrics and an address of a database device with additional information for the client, and/or authentication information such as type of authentication, handshaking protocol, client authentication keys, client username, client session lifetime, and/or client policies.

In an example embodiment, the context data (or cookie) is encrypted. The context data may be encrypted with a key known by APs 102, 104, 106 and/or WLC 110 but not known by mobile device 108, which prevents mobile device 108 from modifying with the context data.

In an example embodiment, the APs 102, 104, 106 and/or WLC 110 is operable to add new traffic context and/or new association context data. In particular embodiments, the APs 102, 104, 106 and/or WLC 110 is operable to examine packet payloads and classify packets based on payload contents, and the data representative of traffic context further comprises data representative of packet classification obtained from examining packet payloads. For example, APs 102, 104, 106, and/or WLC 110 may snoop packets received from mobile device 108 for NBAR (Network Based Application Recognition, available from Cisco Systems, Inc., 170 West Tasman Dr., San Jose, Calif. 95134, www.cisco.com) classifiers. NBAR examines packet payloads and classifies packets on the payload content such as transaction identification, message types, or other suitable data. NBAR can classify packets based on Layer 4 through Layer 7 protocols, which dynamically assign TCP/UDP ports. By looking beyond the TCP/UDP port numbers of a packet (known as subport classification), NBAR examines the packet payload and classifies packets on the payload content, such as transaction identifiers, message types, or other similar data. For example, HTTP traffic can be classified by Universal Resource Locators (URL) or Multipurpose Internet Mail Extension (MIME) types. NBAR can also recognize applications based on regular expressions, and can also recognize encrypted applications based on heuristics. Mission critical applications, such as ERP ("Enterprise Resource Planning," a business management software that allows an organization to use a system of integrated applications to manage the business. ERP software integrates all facets of an operation, including development, manufacturing, sales, and marketing) and workforce optimization applications can be intelligently identified and classified using Network Based Application Recognition (NBAR). Once these mission critical applications are classified they can be guaranteed a minimum amount of bandwidth, policy routed, and marked for preferential treatment. Non-critical applications including Internet gaming applications and MP3 file sharing applications can also be classified using NBAR and marked for best effort service, policed, or blocked as required. The data representative of traffic context can be updated with application data discovered during packet payload examination. The AP 102, 104, 106 and/or WLC 110 may selectively include flows, such as prioritized voice and video flows, or any flow that is latency sensitive. In particular embodiments, the application data, such as specifics of the application and/or application details (e.g., NBAR tuples) can be compressed before being provided to mobile device 108.

In an example embodiment, the context data (or e.g., cookie) includes a timestamp. For example, AP 102 can include a timestamp in the context data provided to mobile device 108. When mobile device 108 roams to a new AP (e.g., AP 104), AP 104 can obtain the timestamp from the context data to retrieve updated context data from the network 100 if needed. For example, the timestamp can be employed to lookup flows that are not latency sensitive (e.g., best effort flows) started just before the mobile device 108 roamed and context information collected after the timestamp.

In an example embodiment, APs that associate with mobile device 108 can update the context data. For example, when mobile device 108 associates with AP 102, AP 102 may create or update a cookie with context data. When the mobile device 108 roams to AP 104, AP 104 may update the context data. If mobile device 108 roams to AP 106, AP 106 may also update the context data. Thus, a detailed client roaming history and specifics can be saved in the cookie.

Figure 2:
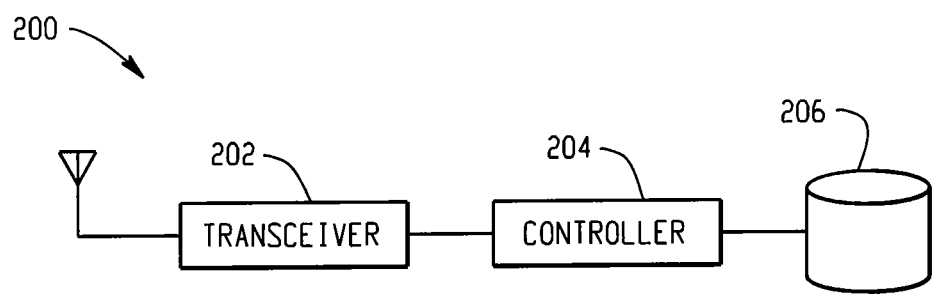
FIG. 2 is a block diagram illustrating an example of an apparatus for implementing an example embodiment.

FIG. 2 is a block diagram illustrating an example of an apparatus 200 for implementing an example embodiment. The apparatus comprises a wireless transceiver 202 for sending and receiving data and a controller 204 for implementing the functionality described herein. The controller may suitably comprise logic for performing the described functionality. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor (not shown, see e.g., FIG. 3). Logic may suitably comprise one or more modules configured to perform one or more functions.

In particular embodiments, the apparatus 200 may further comprise a data storage unit 206. The data storage unit may suitably comprise a tangible, non-transitory computer readable medium encoded with computer readable instructions for execution by a processor. The term "computer-readable medium" as used herein refers to any medium that participates in providing instructions to a processor for execution. Such a medium may take many forms, including but not limited to non-volatile media, and volatile media. Non-volatile media include, for example, optical or magnetic disks. Volatile media include dynamic memory, such as a Read Only Memory (ROM) and/or a Random Access Memory ("RAM") which in particular embodiments can be a read/write memory. As used herein, tangible media may include any non-transitory media such as a volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, apparatus 200 can be employed to implement a WLC, such as WLC 110 described in FIG. 1 and/or an AP such as APs 102, 104, 106 described in FIG. 1. In an example embodiment, logic in controller 204 provisions, via wireless transceiver 202, an associated wireless client with data representative of context data, such as association context data and/or traffic context data for the wireless client. In particular embodiments, the context data is provided as an opaque cookie to the wireless client.

When a wireless client roams to a new AP, the wireless client provides the context data received from a previously associated AP. The context data is obtained by the controller 204 via wireless transceiver 202. The context data may be provided from the wireless client in an association and/or re-association response. The controller 204 may update the context information anytime while associated with the wireless client.

In an example embodiment, the controller 204 provides the context data in a management frame received from AP 102. In another example embodiment, the controller 204 provides the context data in an action frame. In yet another example embodiment, the controller 204 may provide the context data in management and action frames.

In an example embodiment, the context data is sent via an IE, in a TLV field or in a plurality, or sequence of TLV fields. Optionally, a checksum may be employed to validate the context data. The context data may include, but is not limited to, data representative of the WLAN controller's IP address (which may or may not be the same as controller 204), a client mobility group identifier, previously admitted services and traffic classifiers, an IP address for the wireless client, VLAN data for the wireless client, AP BSSID, AP Ethernet MAC address, AP IP address, channel, location, path metrics, an address of a database device with additional information for the client, and/or authentication information such as type of authentication, handshaking protocol, client authentication keys, client username, client session lifetime, and/or client policies.

In an example embodiment, the controller 204 encrypts the context data (or cookie). The context data may be encrypted with a key known by APs and/or WLCs but not known by wireless client, which prevents wireless client from modifying with the context data.

In an example embodiment, the controller 204 is operable to add new traffic context and/or new association context data. In particular embodiments, the controller 204 is operable to examine packet payloads received from a wireless client via wireless transceiver 202 and classify packets based on payload contents. The controller 204 may update the data representative of traffic context with data representative of packet classification obtained from examining packet payloads. The controller 204 may selectively include flows, such as prioritized voice and video flows, or any flow that is latency sensitive. In particular embodiments, the application detail (e.g., NBAR tuples) can be compressed by the controller 204 before being provided to wireless client.

In an example embodiment, the controller 204 includes a timestamp in the context data (e.g., cookie) provided to a wireless client. When a new wireless client roams, the controller 204 can obtain the timestamp from the context data to retrieve updated context data from an associated network, if needed. For example, the timestamp can be employed to lookup flows that are not latency sensitive (e.g., best effort flows) started just before the wireless client roamed and/or context information collected after the timestamp.

In an example embodiment, whenever a wireless client associates, the controller 204 can update the context data. Thus, a detailed client roaming history and specifics can be saved in the cookie.

In an example embodiment, apparatus 200 can be employed to implement a mobile device, such as mobile device 108 described in FIG. 1. The controller receives context data via wireless transceiver 202 from a first access point. The controller 204 stores the context data in the data storage unit 206. When the wireless transceivers 202 associates with another access point (or with a different radio), the controller 204 retrieves the context data from the data storage unit 206 and provides the cookie to the new access point via wireless transceiver 202. In an example embodiment, the context data is provided by the first access point is an opaque (encrypted) cookie.

In particular embodiments, the context data is in an opaque cookie with the context of the client as an additional informational element (IE) in the association/re-association response. The information element can be attached to any management frame and/or action frame sent to the client. For example, a de-authentication frame and/or any 802.11v and/or 802.11k message to the client. The element can also be the sole information element in an action frame.

In an example embodiment, the context data is sent via an IE in a TLV field or in a plurality, or sequence of TLV fields. Optionally, a checksum may be employed to validate the context data.

Figure 3:
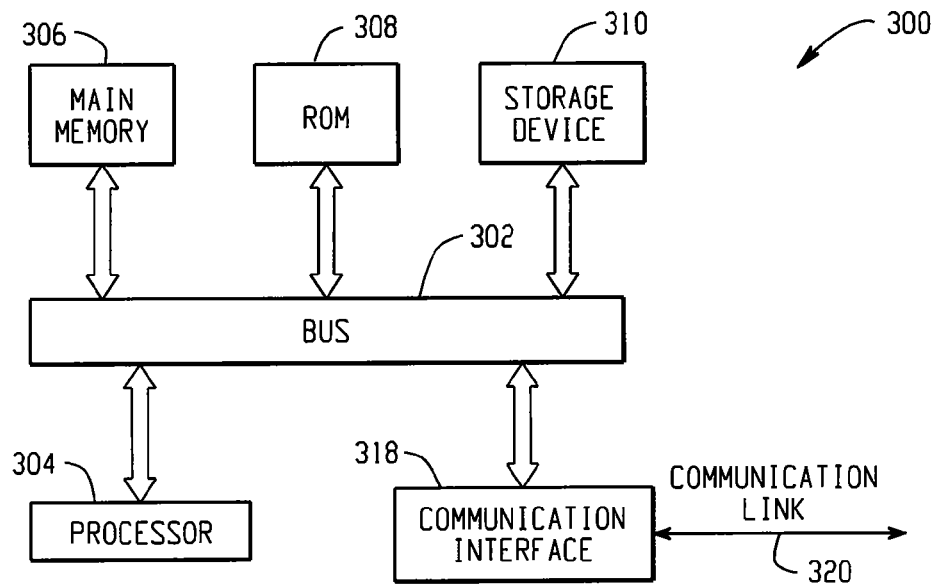
FIG. 3 is a block diagram illustrating an example of a computer system upon which an example embodiment can be implemented.

FIG. 3 is a block diagram illustrating an example of a computer system 300 upon which an example embodiment can be implemented. Computer system 300 may be employed to implement the functionality of APs 102, 104, 106 (FIG. 1), mobile device 108 (FIG. 1), WLC 110 (FIG. 1), and/or controller 204 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

An aspect of the example embodiment is related to the use of computer system 300 for employing a cookie for wireless client association and traffic context. According to an example embodiment, employing a cookie for wireless client association and traffic context is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

Computer system 300 also includes a communication interface 318 coupled to bus 302. Communication interface 318 provides a two-way data communication coupling computer system 300 to a communication link 320. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

For example, computer system 300 may be employed to implement a WLC, such as WLC 110 in FIG. 1 or APs 102, 104, 106 in FIG. 1, computer system 300 may employ the communication interface to send context data to a wireless client. When a wireless client roams to a new AP, association and traffic context data may be received from the wireless client via communication interface 318.

In an example embodiment, computer system 300 may be employed to implement a mobile device (wireless client) such as mobile device 108 in FIG. 1. Computer system may receive association and traffic context data from an AP and/or WLC via communication interface 318. When the wireless client roams to a new AP, the previously provided association and context data may be provided to the new AP/WLC via communication interface 318.

Figure 4:
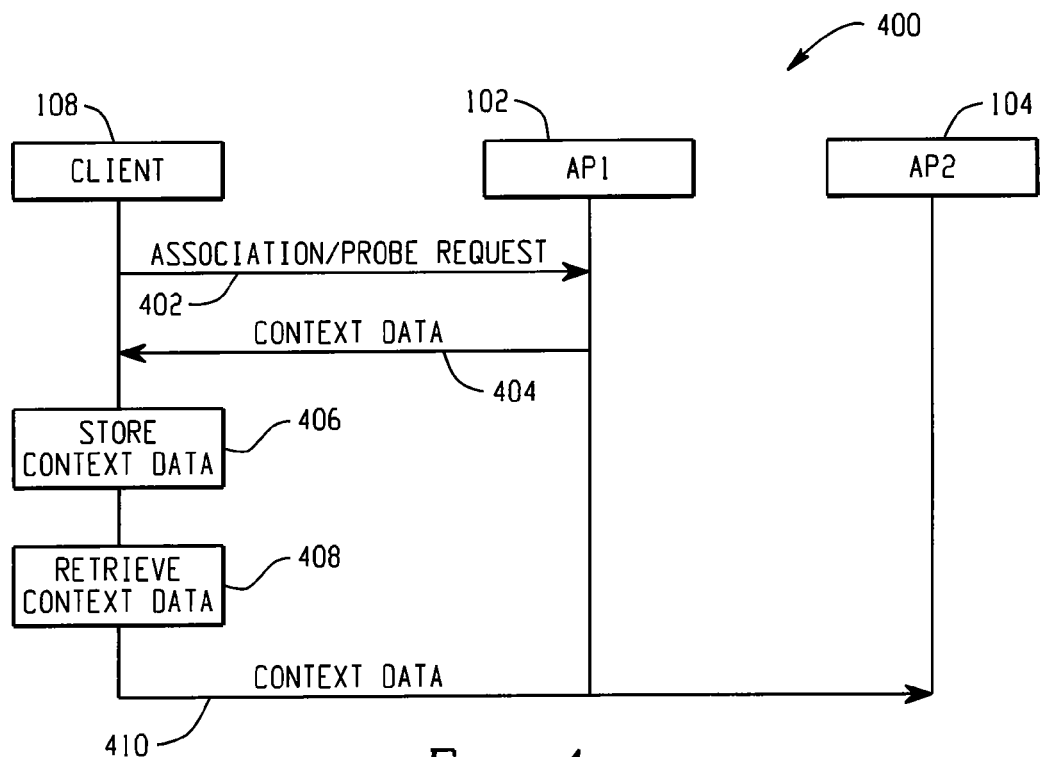
FIG. 4 is an example of a signal diagram for implementing an example embodiment.

FIG. 4 is an example of a signal diagram 400 for implementing an example embodiment. For ease of illustration, the example refers to mobile device (client) 108, access points 102 and 104 described in FIG. 1.

At 402, the mobile device 108 sends an association request to the first AP (AP 102 in this example). Upon associating, the first AP 102, at 404, sends context data, which may be in the form of a cookie, to the mobile device 108. In an example embodiment, the context data is sent in an association/reassociation response frame; however, the context data may be sent in a separate frame, such as a predefined frame, in a management frame, and/or in an action frame. At 406, the mobile device 108 stores the context data. As noted herein, the context data may be updated by the first AP 102 while the mobile device 108 is associated with the first AP 102.

The mobile device then roams to the second AP 104. Upon roaming to the second AP, the mobile device 108, at 408, retrieves the context data. At 410, the mobile device sends the context data to the second AP 104. The context data can be sent in a probe request, association request and/or re-association request frame; however, the context data may be sent in a separate frame, such as a predefined frame, in a management frame, and/or in an action frame. As noted herein, the context data may be updated by the second AP 104 while the mobile device 108 is associated with the second AP 104.

In view of the foregoing structural and functional features described above, methodologies in accordance with example embodiments will be better appreciated with reference to FIGS. 5 and 6. While, for purposes of simplicity of explanation, the methodologies of FIGS. 5 and 6 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

FIG. 5 is an example of a methodology 500 performed by an infrastructure node such as an access point or wireless local area network controller. For example, methodology 500 may be performed by access points 102, 104, 106 (FIG. 1), WLC 110 (FIG. 1), apparatus 200 (FIG. 2), and/or computer system 300 (FIG. 3).

At 502, the infrastructure node associates with a client. At 504, a determination is made whether the context data was provided by the client. The context data may be provided as part of the association protocol (e.g., in a probe, association, and/or reassociation frame), or may be provided after association.

If, at 504, no context data was received (NO), at 506, the infrastructure node obtains context data for the client. The context data may be obtained from another node on the infrastructure network such as from an AAA (Authentication Authorization, and Accounting) Server and/or from the access point that the client is roaming from. The context data is sent to the client at 508. In an example embodiment, the infrastructure node provides the context information in an opaque cookie. The cookie can suitably comprise data representative of the context of the client, such as the WLC, AP, VLAN (Virtual Local Area Network), association details and current traffic information of the client. When the client roams to a new AP, the client hands the cookie to the new AP via the association request.

In an example embodiment, the infrastructure node attaches the opaque cookie with the context of the client as an additional information element (IE) in the association/reassociation response. As indicated by 512 and 514, the Infrastructure node can update this information anytime while the client is associated. In another example embodiment, the infrastructure node can attach an information element to any management frame or action frame sent to the client. For example, re-authentication frame and/or any 802.11v and/or 802.11k message to the client (as used herein, 802.11 refers to the Institute of Electrical and Electronics Engineers "IEEE" 802.11 standard). The element can also be the sole information element in an action frame.

In an example embodiment, the cookie element can be, for example, a TLV (Type Length Value) or a sequence of TLVs and with a checksum at the end. The TLVs can carry, for example, the following information: current WLC IP (Internet Protocol) address or identifier, client mobility group ID, previously admitted services and traffic classifiers, client IP address and VLAN, AP identifiers such as BSSID (Basic Service Set Identifier), Ethernet MAC (Media Access Control) address, IP address, WLANs, channel, location, path metrics and an address of a database device with additional information for the client.

If, at 504, context data was received (YES), the association and traffic context data for communicating with the client is obtained from the received context data. The infrastructure node can also update the context data on the client as new context is established. For example, a parent AP can derive NBAR (Network Based Application Recognition) classifiers by snooping client packets and pushes the NBAR classifiers to the client in a signed opaque blob as they are being derived. The client's NBAR classifiers will later be transferred to the new parent AP when the client roams.

At 512, a determination is made whether the context should be updated. The context data should be updated if there is a change in the association and/or traffic context and/or if there is new association and/or traffic context. If the context should be updated (YES), at 514, the updated context data is provided to the client. If, at 512, there are no updates to the context (NO), the infrastructure node waits until there is an update.

FIG. 6 is an example of a methodology 600 performed by a mobile (e.g., wireless) device. For example, methodology 600 may be performed by mobile device 108 described in FIG. 1, apparatus 200 described in FIG. 2, and/or computer system 300 described in FIG. 3.

At 602, the client associates with a first access point. At 604, the client receives context data from the first access point. The context data may be received in a probe response, association response, re-association response, or in a separate frame such as a management frame or an action frame.

In an example embodiment, the context data is in an opaque cookie with the context of the client as an additional information element (IE) in the association/re-association response. The information element can be attached to any management frame and/or action frame sent to the client. For example a de-authentication frame and/or any 802.11v and/or 802.11k message to the client. The element can also be the sole information element in an action frame.

In an example embodiment, the context data is sent via an IE in a TLV field or in a plurality, or sequence of TLV fields. Optionally, a checksum may be employed to validate the context data.

At 606, the client roams to a second access point. At 608, the client provides the context data that was received from the first access point to the second access point. The context data can be sent in a probe request, association request and/or re-association request frame; however, the context data may be sent in a separate frame, such as a predefined frame, in a management frame, and/or in an action frame. As noted herein, the context data may be updated by the second access point while the mobile device is associated with the second access point.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
receiving, by a second wireless access point, a second association request from a wireless device, wherein the second association request specifies to join a network and includes encrypted context data comprising a plurality of attributes of a roaming history of the mobile device stored in a plurality of type-length-value fields, wherein the roaming history specifies the association between the wireless device and a first wireless access point; the encrypted context data having been previously sent to the wireless device by the first wireless access point in response to the wireless device sending to the first wireless access point a first association request specifying to join the network;

modifying, by the second wireless access point, the encrypted context data to reflect the association between the wireless device and the second wireless access point; and sending, by the second wireless access point, the modified encrypted context data to the wireless device.

2. The method of claim 1, wherein the plurality of attributes of the encrypted context data, when sent from the first wireless access point to the wireless device, comprise: a first timestamp reflecting the first association request, an internet protocol (IP) address of the first wireless access point, an IP address of the wireless device when connected to the first wireless access point, a client mobility group identifier, a set of previous admitted services and traffic classifiers, a virtual local area network identifier for the wireless device, a basic service set identifier for the first wireless access point, an Ethernet media access control address for the first wireless access point, an authentication key for the wireless device, a client username associated with the wireless device, a session lifetime for the wireless device, and a set of policies for the wireless device.

3. The method of claim 2, wherein the plurality of attributes of the encrypted context data, when modified by the second wireless access point, further comprise: a second timestamp reflecting the second association request, an internet protocol (IP) address of the second wireless access point, an IP address of the wireless device when connected to the second wireless access point, an updated set of previous admitted services and traffic classifiers, a basic service set identifier for the second wireless access point, an Ethernet media access control address for the second wireless access point.

4. The method of claim 3, wherein the first and second wireless access points decrypt the encrypted context data using a key that is not shared with the wireless device.

5. The method of claim 4, wherein the second wireless access point uses the first timestamp to retrieve a set of attributes from an infrastructure network, wherein the second wireless access point uses the retrieved set of attributes to modify the context data.

6. The method of claim 5, wherein the first wireless access point sends the encrypted context data to the wireless device subsequent to authenticating the wireless device on the network, wherein the second wireless access point sends the encrypted context data to the wireless device subsequent to authenticating the wireless device on the network.

7. The method of claim 6, wherein the encrypted context data further comprises a checksum used by the first and second wireless access points to validate the encrypted context data, wherein the encrypted context data comprises a cookie.

8. A non-transitory computer readable medium storing instructions which when executed by a processor performs an operation comprising:
sending, by a wireless device to a first wireless access point, a first association request specifying to join a network;

receiving, by the wireless device from the first wireless access point, encrypted context data comprising a plurality of attributes of a roaming history of the mobile device stored in a plurality of type-length-value fields, wherein the roaming history specifies the association between the wireless device and the first wireless access point;

sending, by the wireless device to a second wireless access point, a second association request, wherein the second association request specifies to join the network and includes the encrypted context data, wherein the second wireless access point modifies the encrypted context data to reflect the association between the wireless device and the second wireless access point; and receiving, by the wireless device from the second wireless access point, the modified encrypted context data.

9. The non-transitory computer readable medium of claim 8, wherein the plurality of attributes of the encrypted context data, when received by the wireless device from the first wireless access point, comprise: a first timestamp reflecting the first association request, an internet protocol (IP) address of the first wireless access point, an IP address of the wireless device when connected to the first wireless access point, a client mobility group identifier, a set of previous admitted services and traffic classifiers, a virtual local area network identifier for the wireless device, a basic service set identifier for the first wireless access point, an Ethernet media access control address for the first wireless access point, an authentication key for the wireless device, a client username associated with the wireless device, a session lifetime for the wireless device, and a set of policies for the wireless device.

10. The non-transitory computer readable medium of claim 9, wherein the plurality of attributes of the encrypted context data, when modified by the second wireless access point, further comprise: a second timestamp reflecting the second association request, an internet protocol (IP) address of the second wireless access point, an IP address of the wireless device when connected to the second wireless access point, an updated set of previous admitted services and traffic classifiers, a basic service set identifier for the second wireless access point, an Ethernet media access control address for the second wireless access point.

11. The non-transitory computer readable medium of claim 10, wherein the first and second wireless access points decrypt the encrypted context data using a key that is not shared with the wireless device.

12. The non-transitory computer readable medium of claim 11, wherein the second wireless access point uses the first timestamp to retrieve a set of attributes from an infrastructure network, wherein the second wireless access point uses the retrieved set of attributes to modify the context data.

13. The non-transitory computer readable medium of claim 12, wherein the wireless device receives the encrypted context data from the first wireless access point subsequent to being authenticating on the network, wherein the wireless device receives the encrypted context data from the second wireless access point subsequent to being authenticating on the network.

14. The non-transitory computer readable medium of claim 13, wherein the encrypted context data further comprises a checksum used by the first and second wireless access points to validate the encrypted context data, wherein the encrypted context data comprises a cookie.

15. A method, comprising:
sending, by a wireless device to a first wireless access point, a first association request specifying to join a network;

receiving, by the wireless device from the first wireless access point, encrypted context data comprising a plurality of attributes of a roaming history of the mobile device stored in a plurality of type-length-value fields, wherein the roaming history specifies the association between the wireless device and the first wireless access point;

sending, by the wireless device to a second wireless access point, a second association request, wherein the second association request specifies to join the network and includes the encrypted context data, wherein the second wireless access point modifies the encrypted context data to reflect the association between the wireless device and the second wireless access point; and receiving, by the wireless device from the second wireless access point, the modified encrypted context data.

16. The method of claim 15, wherein the plurality of attributes of the encrypted context data, when sent from the first wireless access point to the wireless device, comprise: a first timestamp reflecting the first association request, an internet protocol (IP) address of the first wireless access point, an IP address of the wireless device when connected to the first wireless access point, a client mobility group identifier, a set of previous admitted services and traffic classifiers, a virtual local area network identifier for the wireless device, a basic service set identifier for the first wireless access point, an Ethernet media access control address for the first wireless access point, an authentication key for the wireless device, a client username associated with the wireless device, a session lifetime for the wireless device, and a set of policies for the wireless device.

17. The method of claim 16, wherein the plurality of attributes of the encrypted context data, when modified by the second wireless access point, further comprise: a second timestamp reflecting the second association request, an internet protocol (IP) address of the second wireless access point, an IP address of the wireless device when connected to the second wireless access point, an updated set of previous admitted services and traffic classifiers, a basic service set identifier for the second wireless access point, an Ethernet media access control address for the second wireless access point.

18. The method of claim 17, wherein the first and second wireless access points decrypt the encrypted context data using a key that is not shared with the wireless device.

19. The method of claim 18, wherein the second wireless access point uses the first timestamp to retrieve a set of attributes from an infrastructure network, wherein the second wireless access point uses the retrieved set of attributes to modify the context data.

20. The method of claim 19, wherein the wireless device receives the encrypted context data from the first wireless access point subsequent to being authenticating on the network, wherein the wireless device receives the encrypted context data from the second wireless access point subsequent to being authenticating on the network.

21. The method of claim 20, wherein the encrypted context data further comprises a checksum used by the first and second wireless access points to validate the encrypted context data, wherein the encrypted context data comprises a cookie.

22. A system, comprising;
a processor; and
a memory containing a program which when executed by the processor performs an operation comprising:
sending, by a wireless device to a first wireless access point, a first association request specifying to join a network;

receiving, by the wireless device from the first wireless access point, encrypted context data comprising a plurality of attributes of a roaming history of the mobile device stored in a plurality of type-length-value fields, wherein the roaming history specifies the association between the wireless device and the first wireless access point;

sending, by the wireless device to a second wireless access point, a second association request, wherein the second association request specifies to join the network and includes the encrypted context data, wherein the second wireless access point modifies the encrypted context data to reflect the association between the wireless device and the second wireless access point; and receiving, by the wireless device from the second wireless access point, the modified encrypted context data.

23. The system of claim 22, wherein the plurality of attributes of the encrypted context data, when received by the wireless device from the first wireless access point, comprise: a first timestamp reflecting the first association request, an internet protocol (IP) address of the first wireless access point, an IP address of the wireless device when connected to the first wireless access point, a client mobility group identifier, a set of previous admitted services and traffic classifiers, a virtual local area network identifier for the wireless device, a basic service set identifier for the first wireless access point, an Ethernet media access control address for the first wireless access point, an authentication key for the wireless device, a client username associated with the wireless device, a session lifetime for the wireless device, and a set of policies for the wireless device.

24. The system of claim 23, wherein the plurality of attributes of the encrypted context data, when modified by the second wireless access point, further comprise: a second timestamp reflecting the second association request, an internet protocol (IP) address of the second wireless access point, an IP address of the wireless device when connected to the second wireless access point, an updated set of previous admitted services and traffic classifiers, a basic service set identifier for the second wireless access point, an Ethernet media access control address for the second wireless access point.

25. The system of claim 24, wherein the first and second wireless access points decrypt the encrypted context data using a key that is not shared with the wireless device, wherein the second wireless access point uses the first timestamp to retrieve a set of attributes from an infrastructure network, wherein the second wireless access point uses the retrieved set of attributes to modify the context data, wherein the encrypted context data comprises a cookie.

* * * * *